(12) United States Patent
Simpson et al.

(10) Patent No.: US 7,644,812 B2
(45) Date of Patent: Jan. 12, 2010

(54) USING INFERRED TORQUE CONVERTER IMPELLER SPEED TO CONTROL AN IMPELLER CLUTCH

(75) Inventors: William R. Simpson, Saline, MI (US); Jacob M. Povirk, Franklin, MI (US); Christopher G. Garbacz, Livonia, MI (US); David B. Plasencia, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 503 days.

(21) Appl. No.: 11/799,153

(22) Filed: May 1, 2007

(65) Prior Publication Data

US 2008/0271966 A1 Nov. 6, 2008

(51) Int. Cl.
*F16H 61/48* (2006.01)
(52) U.S. Cl. .................. 192/3.33; 192/3.26; 192/3.3
(58) Field of Classification Search ........... 192/3.21, 192/3.26
See application file for complete search history.

(56) References Cited

U.S. PATENT DOCUMENTS

| | | | |
|---|---|---|---|
| 3,537,262 A | 11/1970 | Briski | |
| 3,621,955 A | 11/1971 | Black et al. | |
| 4,529,070 A * | 7/1985 | Kobayashi | 192/3.23 |
| 5,456,333 A | 10/1995 | Brandt et al. | |
| 5,509,520 A | 4/1996 | Evans et al. | |
| 5,535,863 A * | 7/1996 | Vukovich et al. | 192/3.3 |
| 5,720,358 A | 2/1998 | Christensen et al. | |
| 6,234,254 B1 | 5/2001 | Dietz et al. | |
| 7,044,279 B2 | 5/2006 | Leber | |
| 7,055,663 B2 | 6/2006 | Leber | |
| 2008/0227597 A1 * | 9/2008 | Povirk et al. | 477/62 |

* cited by examiner

*Primary Examiner*—Sherry L Estremsky
*Assistant Examiner*—Edwin A. Young
(74) *Attorney, Agent, or Firm*—David B. Kelley; MacMillan, Sobanski & Todd, LLC

(57) ABSTRACT

A method for controlling an impeller clutch of a torque converter includes determining a function relating a K-factor of the torque, determining a current engine torque, determining a desired impeller clutch slip, using the function determine the actual impeller speed and thus actual clutch slip, and adjusting the operating state of the impeller clutch to produce the desired impeller clutch slip.

15 Claims, 4 Drawing Sheets

USING INFERRED TORQUE CONVERTER IMPELLER SPEED TO CONTROL AN IMPELLER CLUTCH

BACKGROUND OF THE INVENTION

1. Field of the Invention

This invention relates generally to a torque converter for an automatic transmission, and, in particular, to determining the rotating speed of a torque converter impeller without a speed sensor for this purpose.

2. Description of the Prior Art

A torque converter is a modified form of a hydrodynamic fluid coupling, and like a fluid coupling, is used to transfer rotating power from a prime mover, such as an internal combustion engine or electric motor, to a rotating driven load. A torque converter is able to multiply torque when there is a substantial difference between input and output rotational speed, thus providing the equivalent of a reduction gear.

In a torque converter there are at least three rotating elements: the impeller, which is mechanically driven by the prime mover; the turbine, which drives the load; and the stator, which is interposed between the impeller and turbine so that it can alter oil flow returning from the turbine to the impeller. The classic torque converter design dictates that the stator be prevented from rotating under any condition, hence the term stator. In practice, however, the stator is mounted on an overrunning clutch, which prevents the stator from counter-rotating the prime mover but allows for forward rotation.

In a torque converter there are at least three rotating elements: the impeller, which is mechanically driven by the prime mover; the turbine, which drives the load; and the stator, which is interposed between the impeller and turbine so that it can alter oil flow returning from the turbine to the impeller. The classic torque converter design dictates that the stator be prevented from rotating under any condition, hence the term stator. In practice, however, the stator is mounted on an overrunning clutch, which prevents the stator from counter-rotating the prime mover but allows for forward rotation.

Losses within the torque converter reduce efficiency and generate waste heat. In modern automotive applications, this problem is commonly avoided by use of a lock-up clutch, which that physically links the impeller and turbine, effectively changing the converter into a purely mechanical coupling. The result is no slippage, and therefore virtually no power loss and improved fuel economy.

The next generation of torque converter technology enables the decoupling of the impeller from the engine during idle, better known as idle disconnect. The decoupling of the impeller reduces engine load and thereby fuel consumption during drive and reverse idle. This decoupling is accomplished with an impeller clutch between the impeller and engine. The impeller clutch is controlled by a pressure differential between converter charge and discharge circuits.

To control accurately engagement, disengagement and slip of the impeller clutch, it is necessary to know the rotating speed of the impeller.

When the impeller clutch is slipping, impeller speed is less than engine speed. In order to control the slip across the impeller clutch real time impeller speed is required. Impeller speed can be determined from a signal representing impeller speed produced by sensor located in the torque converter. This requires a high powered sensor in the bell housing and forming the converter housing of a nonmagnetic material such as aluminum or stamping the housing from a sheet of low-carbon stainless steel. Low-carbon stainless steel, if heat treated properly, does not have magnetic properties and is transparent to a conventional sensor. This method requires a large air gap between the sensor and magnetic pick up on the impeller, causes the converter housing to be brittle, and adds complexity and cost to the components and assembly.

There is a need in the industry for a more cost efficient technique to determine the impeller speed continuously in real time.

SUMMARY OF THE INVENTION

A method for controlling an impeller clutch of a torque converter includes determining a function relating a K-factor of the torque converter and a speed ratio of the torque converter, determining a current engine torque, determining a desired slip across the impeller clutch, determining the actual impeller speed, and adjusting the operating state of the impeller clutch to produce the desired slip across the impeller clutch. Impeller speed is equal to the difference between engine speed and slip across the impeller clutch.

The method provides an inferred impeller speed to allow precise hydraulic control of the slip across the impeller clutch enabling variable torque converter K-curves based upon the vehicle operator's demand. The ability, through precise hydraulic control of the converter charge and discharge circuits, to slip the impeller relative to the engine increases the K-curve beyond what is defined by the internal torque converter hardware geometry and can be used to improve performance, performance feel and fuel economy.

A system for controlling the torque converter of an automatic transmission includes an impeller, a turbine, and an impeller clutch for alternately engaging and disengaging a drive connection between the impeller and the power source; and a controller configured to determine a current magnitude of torque produced by the power source, a desired slip across the impeller clutch, and to change the operating state of the impeller clutch such that the actual impeller clutch slip is equal to the desired impeller clutch slip.

The impeller speed of the torque converter, which is needed to calculate the actual slip across the impeller clutch, can be determined from two variables: the turbine speed and engine torque, which are either directly measured or calculated in an electronic controller. Along with this information, a function that characterizes the K-factor of the converter as a function of speed ratio is needed over the range where the impeller clutch will be slipping.

The impeller clutch enables the decoupling of the impeller from the engine during engine idle conditions. Decoupling the impeller reduces load on the engine caused by the torque converter and improves fuel consumption in forward drive, reverse drive and neutral idle operation.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
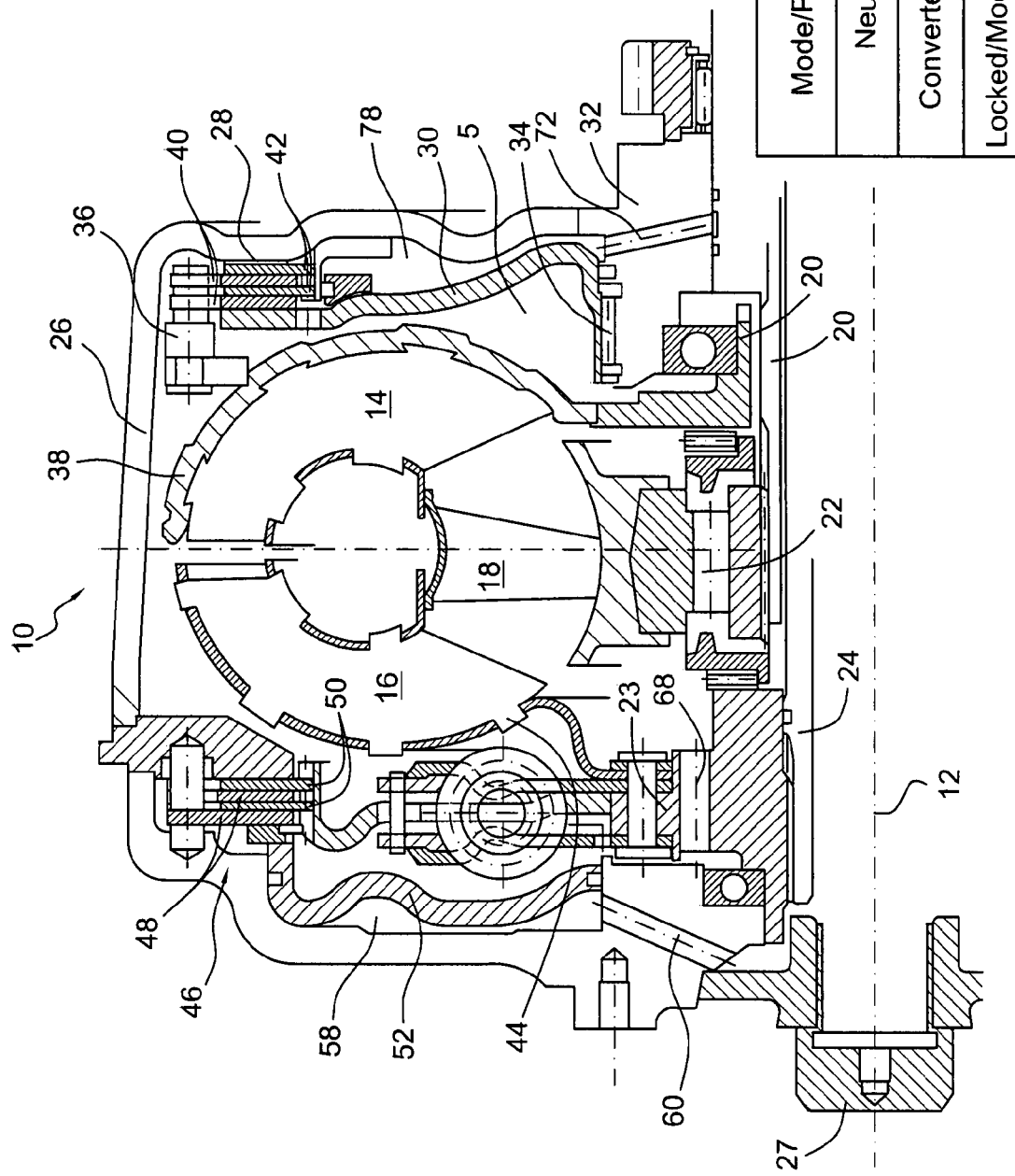
FIG. 1 is a cross section through a torque converter having a bypass clutch and impeller clutch.

Referring now to the drawings, there is illustrated in FIG. 1 a torque converter 10, which is arranged about a central axis 12 and includes a bladed impeller 14, a bladed turbine 16, and a bladed stator 18. The impeller, stator and turbine define a toroidal fluid flow circuit, whereby the impeller is hydrokinetically connected to the turbine.

The stator 18 is secured to, and supported for rotation on a stationary stator shaft 20. An overrunning brake 22 anchors the stator to shaft 20 to prevent rotation of the stator in a direction opposite the direction of rotation of the impeller, although free-wheeling motion in the direction of rotation of the impeller is permitted. The turbine 16 is secured by a hub 23 to a rotating transmission input shaft 24, which transmits torque to the transmission gear box (not shown). A torque converter housing 26, surrounding the turbine, impeller and stator, is driveably connected to the crankshaft 27 of an internal combustion engine (not shown) or another power source, such as an electric motor.

Located within a torque converter housing 26 is an impeller clutch 28 for alternately driveably connecting and releasing the impeller 14 and housing 26. Impeller clutch 28 includes a disc 30, supported for rotation on a hub 32 by a bearing 34; an output 36 secured to a shroud 38, which is attached to the periphery of each blade of the impeller 14; friction plates 40, secured to output 36; and clutch discs 42, secured to housing 26.

A torsion damper 44 resiliently connects engine shaft 27 through housing 26 to turbine hub 23.

Also located within torque converter housing 26 is a lockup clutch 46 for alternately driveably connecting and releasing the turbine 16 and engine shaft 27 through cover 26. Clutch 46 includes a first set of friction discs 48, secured at their outer circumference to housing 26, and a second set of friction discs 50, each interleaved between consecutive first discs and secured to the torsion damper 44. Lockup clutch 46 is actuated by a piston 52, which is supported on housing 26 for axial displacement rightward along axis 12. Pressurized fluid in a volume 58, moves piston 52 rightward forcing discs 48, 50 into mutual frictional contact and engaging clutch 46. When lockup clutch 46 is engaged, the engine shaft 45 and turbine 16 are mechanically interconnected and driveably connected to the transmission input shaft 24. When lockup clutch 46 is disengaged, the turbine 16 and engine shaft 45 are mechanically disconnected, and the turbine may be hydrokinetically driven by the impeller 14, provided impeller clutch 28 is fully engaged or slipping.

Fluid that causes lockup clutch 46 alternately to engage or apply and to disengage or release is supplied from a converter apply pressure circuit of the hydraulic system, whose magnitude is varied and regulated by the hydraulic control and actuation system of the transmission. Converter apply pressure $C_{APY}$ is supplied from the converter apply pressure circuit of the hydraulic system to volume 58 through an axial fluid passage 60.

A converter charge pressure hydraulic circuit of the hydraulic system includes axial passage 68, which communicates with the toroidal volume of the torque converter 10. Converter charge pressure $C_{CL}$ supplied from the converter charge pressure circuit of the hydraulic system fills the torque converter 10 and develops a pressure force against the inner surface of impeller clutch disc 30.

A converter discharge hydraulic circuit of the hydraulic system includes passage 72. Converter discharge pressure $C_{OUT}$ supplied from the converter discharge pressure circuit of the hydraulic system, fills a volume 78 between impeller disc 30 and housing 26, and develops a pressure force against the surface of disc 30 that is directed leftward. The engaged, disengaged or slipping state of impeller clutch 28 is determined, at least in part, by the magnitude of the pressure differential across the impeller clutch 28, i.e., ($\Delta$ $C_{APY}$, $C_{OUT}$).

The impeller clutch 28 enables the decoupling of the impeller 14 from the engine shaft 27 during engine idle conditions. Decoupling of the impeller reduces load on the engine caused by the torque converter 10 and fuel consumption in forward drive, reverse drive and neutral idle operation.

When the driver transitions from idle to drive away mode by releasing the brake pedal and depressing the throttle pedal, the impeller clutch 28 must immediately either (1) couple or hard-lock the impeller 14 to the engine shaft 27, or (2) slip the impeller 14 relative to the engine thereby increasing the K-curve of the torque converter. This is accomplished by increasing converter charge pressure while simultaneously decreasing converter discharge pressure to create a pressure differential across the impeller clutch 28.

The magnitude of the K-curve is a measure of the load on the engine. The ability to raise or lower the K-curve has many benefits. For off-the-line performance, a raised K-curve is desirable. During normal driving, a lower K-factor is advantageous for both fuel economy and performance. The ability, through precise hydraulic control of the converter charge and discharge circuits, to slip the impeller relative to the engine increases the K-curve beyond what is defined by the internal torque converter hardware geometry, and can be used to improve performance, performance feel and fuel economy.

The dimensions and geometry of the torque converter, such as blade angles of the impeller 14, turbine 16 and stator 18, define the minimum K-curve. The magnitude of controlled slip across the impeller clutch 28 determines the maximum K-curve.

During operation at wide open engine throttle (WOT) conditions, a raised K-curve will achieve better performance. Therefore it is preferable to slip the impeller clutch during the initial launch of the vehicle, when the engine speed is much greater than the turbine speed, and at low speed ratios of the torque converter 10. As vehicle speed and the converter's speed ratio increase, a decrease in the magnitude of slip across the impeller clutch 28 will optimize efficiency and acceleration. The magnitude of controlled impeller slip is proportional to engine throttle position at launch. As vehicle speed increases and throttle position decreases, the magnitude of slip across the impeller clutch 28 will also decrease. In order to properly control the slip across the impeller clutch, the current speed of the impeller is required along with adaptive converter charge and discharge pressure control.

The impeller speed can be determined by inference using variables that are either directly measured or calculated in the electronic controls used in the vehicle: turbine speed ($N_{turbine}$), engine torque and a function that relates the converter's K-factor to speed ratio across the converter.

Figure 2:
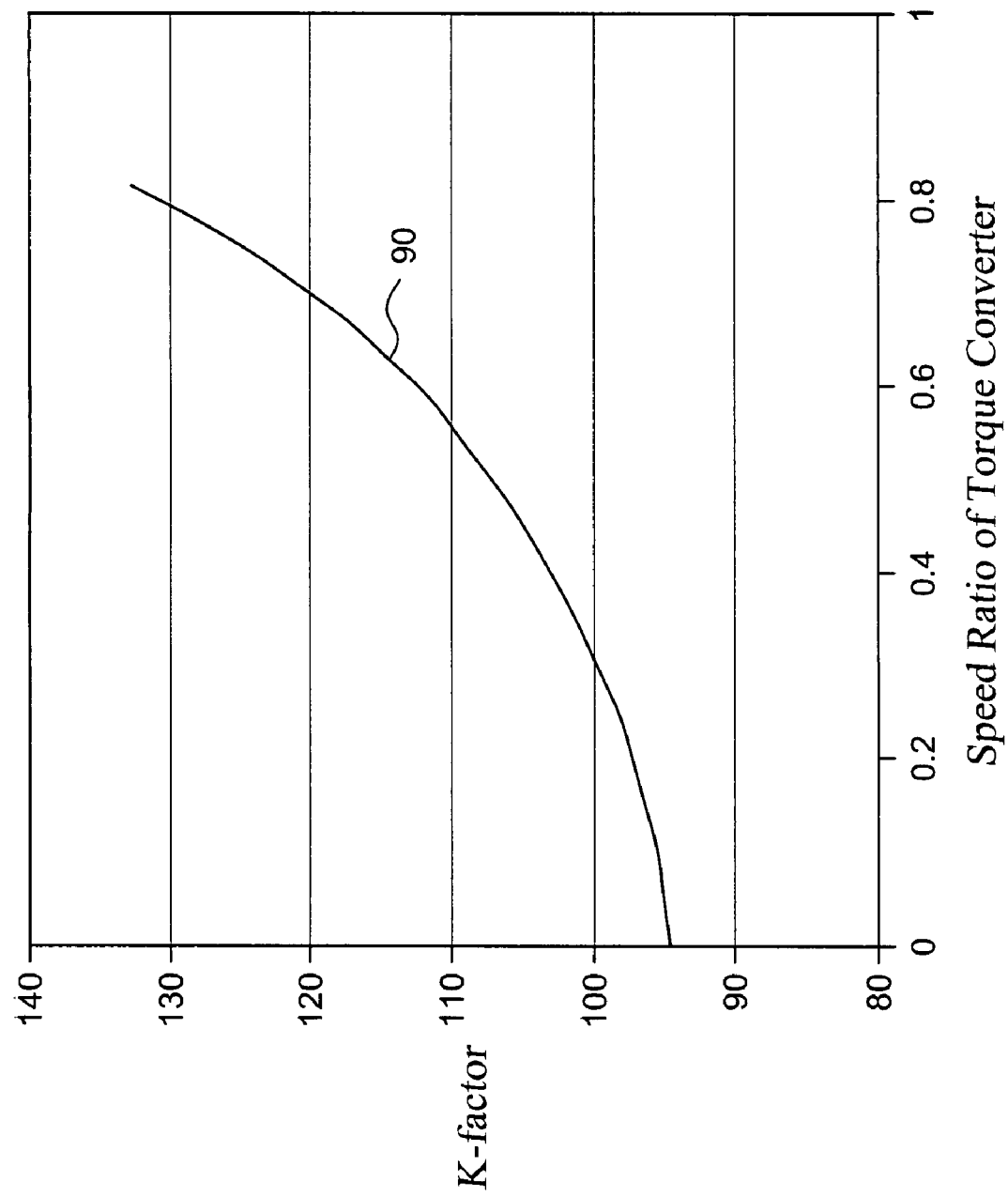
FIG. 2 is graph showing the variation of the K-factor of a torque converter vs. the speed ratio of the torque converter.

The torque converter's speed ratio is the ratio of the speed of turbine 16 divided by the speed of impeller 14. The torque converter K-factor is defined as engine speed divided by the square root of engine torque. FIG. 2 illustrates an empirically determined function 90 that relates the converter's K-factor (Y-axis) and the torque converter's speed ratio (X-axis). An example of a polynomial fitted to function 90 is $$Y=64.22X^2-8.4466X+95.409$$

Figure 3:
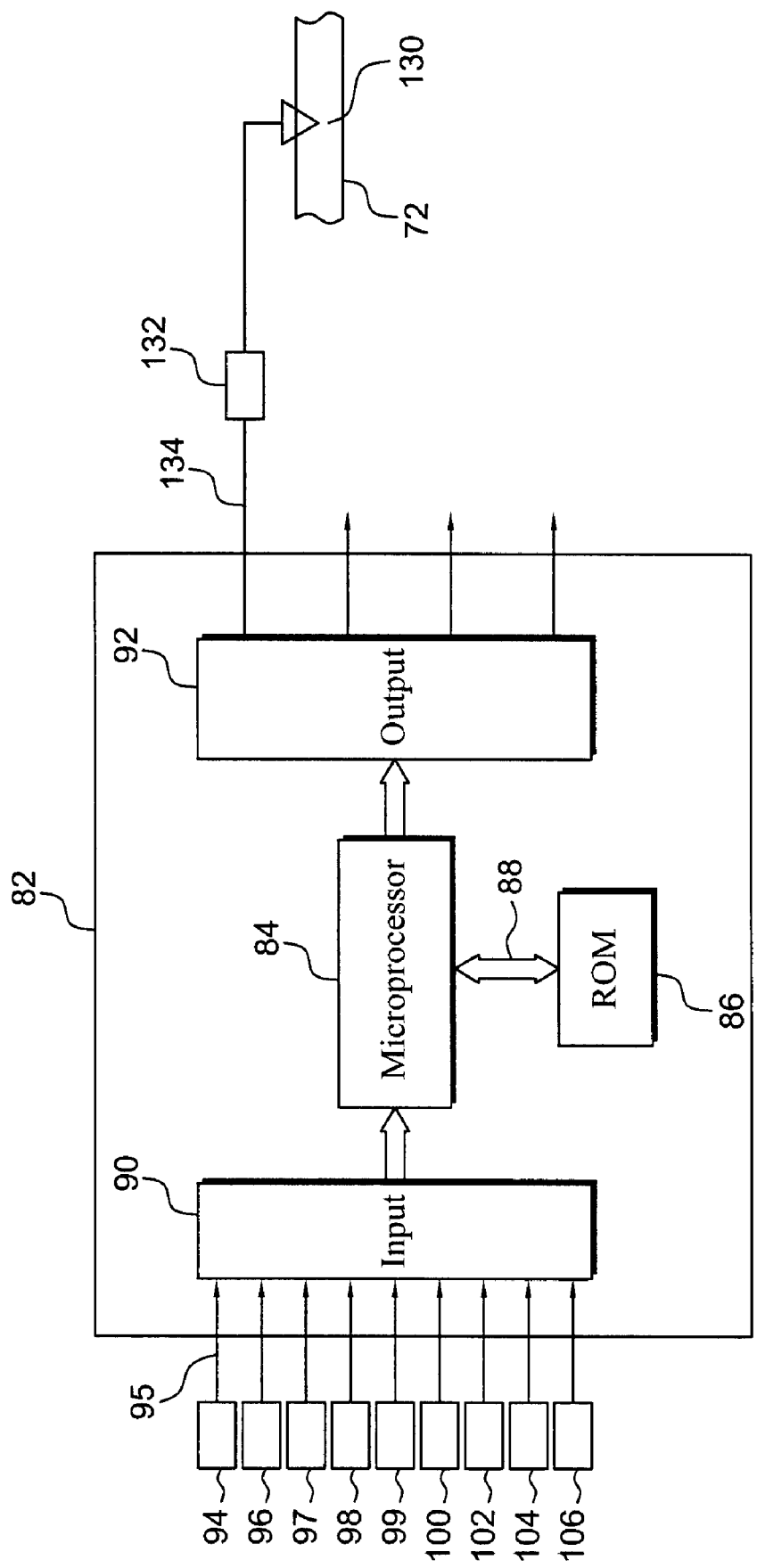
FIG. 3 is a schematic diagram of an electronic controller for controlling the impeller clutch.

FIG. 3 illustrates a system for controlling operation of the engine and transmission. The system includes a controller 82 comprising an electronic microprocessor 84 accessible to electronic memory 86, containing engine and transmission control algorithms, data communication bus 88 interconnecting components of the controller, inlet ports 90 communicating the controller with various powertrain sensors, and outlet ports 92 communicating command signals from the controller to various actuators, which control the engine and transmission in response to the results produced by execution of the algorithms.

The current turbine speed is present in controller 82 and known from the output of a turbine speed sensor 94, which produces an electronic signal 95 representing the speed of the transmission input shaft 24. Information regarding various engine parameters is transmitted to controller 82 from various sensors, which produce electronic signals representing vehicle speed 96, engine speed 97, engine throttle position 98, mass air flow 100, spark timing 102, air-fuel ratio, 104, engine coolant temperature 106, etc. Controller 82 determines the current engine output torque using the algorithms, the input information, and data stored in memory 86. When empirically establishing function 90, engine output torque may be reduced by the magnitude of torque required to accelerate the inertia of the transmission components located in the power path between the engine and the input side of the impeller clutch 28.

Figure 4:
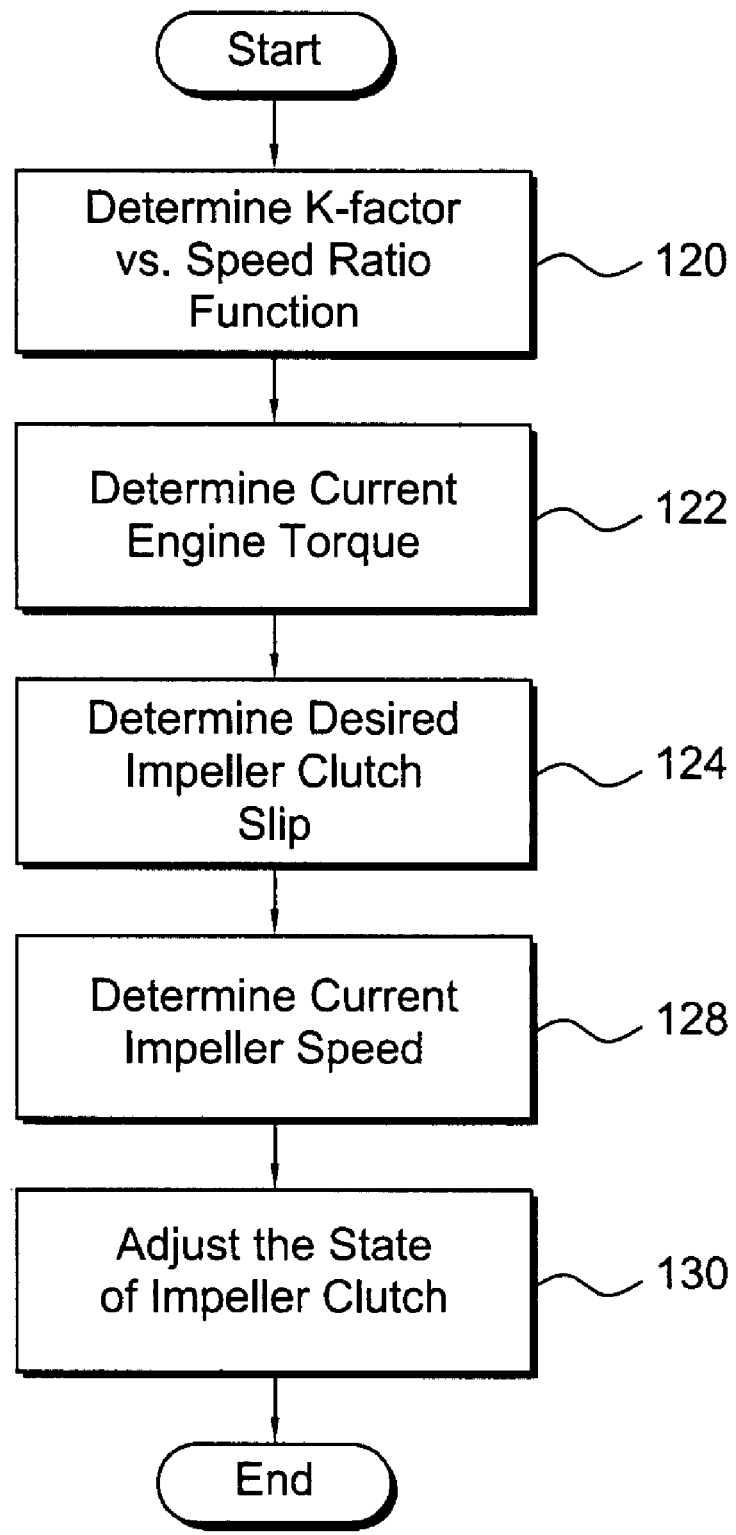
FIG. 4 is a diagram of the method steps for controlling the impeller clutch and determining impeller speed.

FIG. 4 illustrates the steps of a method for determining the current impeller speed and changing the operating state of impeller clutch 28, i.e., its torque transmitting capacity.

At step 120, function 90 is established empirically and a polynomial is fitted to function 90.

At step 122, the current engine torque is determined from the current engine operating parameters.

At step 124, a desired slip across the impeller clutch is determined. Controller 82 determines the desired slip across the impeller clutch 28 from the current operating conditions represented by controller input signals such as vehicle speed, turbine speed, throttle position and gear ratio At step 128, the current impeller speed is inferred using the current engine torque calculated at step 122, current speed ratio of the torque converter, empirically determined function 90 for the torque converter, and measured turbine speed produced by turbine speed sensor 94. The torque converter speed ratio is equal to the ratio of turbine speed divided by engine speed, provided the impeller clutch 28 is locked, or the ratio of turbine speed divided by impeller speed, provided the impeller clutch 28 is slipping.

At step 130, the operating state of impeller clutch 28 is adjusted among fully engaged, fully disengaged, and partially engaged or slipping states to produce the desired torque converter speed ratio. Controller 82 uses the speed of impeller 14 to provide closed feedback control of the torque capacity of impeller clutch 28.

The cross sectional area of an orifice 130, located in the converter discharge circuit 72, is changed by a variable force solenoid (VFS) 132, which responds to command signals 134 from electronic controller 82 in the transmission control unit.

Solenoid 132 is supplied with a variable electric current such that the size of orifice 130 varies in response to the magnitude of the current. Controller 84 issues command signals in response to the results of executing the algorithms. The command signals from controller 82 control the operating states of impeller clutch 28, lockup clutch 46, pressure regulator valves, friction clutches and brakes in the transmission, etc. For example, while operating in engine idle impeller disconnect mode, the cross sectional area of orifice 130 is relatively large. This produces a uniform pressure across impeller clutch 28, thereby allowing the impeller clutch 28 to disengage. During idle disconnect mode, the impeller clutch 28 is in a disengaged or open state. As vehicle speed increases, impeller clutch 28 enters a slipping state and eventually an engaged state.

The desired operating state of impeller clutch 28 is produced by adjusting the differential pressure across clutch 28, preferably by changing the magnitude of the converter discharge pressure $C_{OUT}$ supplied through passage 72 from the converter discharge pressure circuit of the transmission's hydraulic system. The engaged, disengaged or slipping state of impeller clutch 28 is determined, at least in part, by the size of orifice 130 and magnitude of the pressure differential across the impeller clutch 28, i.e., ($\Delta\,C_{APY}, C_{OUT}$).

In accordance with the provisions of the patent statutes, the preferred embodiment has been described. However, it should be noted that the alternate embodiments can be practiced otherwise than as specifically illustrated and described.

What is claimed is:

1. A method for controlling an impeller clutch of a torque converter, comprising the steps of:
    (a) determining a function relating a K-factor of the torque converter and a speed ratio of the torque converter;
    (b) determining a current engine torque;
    (c) determining desired slip across the impeller clutch;
    (d) determining the current K-factor of the torque converter;
    (e) using the function and the current K-factor of the torque converter to determine the current impeller clutch slip; and
    (f) adjusting the operating state of the impeller clutch to produce the desired impeller clutch slip.

2. The method of claim 1, wherein:
    step (e) further comprises the step of using the function and the current K-factor of the torque converter to determine the current impeller clutch slip; and
    the method further comprises using the engine speed and the current impeller clutch slip to determine the current impeller speed.

3. The method of claim 1, wherein step (f) further comprises the steps of:
    communicating hydraulically a source of converter charge pressure to the impeller clutch;
    communicating hydraulically a source of converter discharge pressure to the impeller clutch,
    producing a variable magnitude of a differential force across the impeller clutch due to a converter charge pressure and a converter discharge pressure; and
    producing alternate operating states of the impeller clutch in response to the magnitude of the differential force.

4. The method of claim 1, wherein step (f) further comprises the steps of:
    communicating hydraulically a source of converter charge pressure to the impeller clutch;
    communicating hydraulically a source of converter discharge pressure to the impeller clutch, using an orifice having a variable fluid flow area for changing the magnitude of converter discharge pressure in the torque converter producing a variable magnitude of a differential force across the impeller clutch due to a converter charge pressure and a converter discharge pressure; and producing alternate operating states of the impeller clutch in response to the magnitude of the differential force.

5. A system for controlling a torque converter of an automatic transmission for a vehicle driven by a power source, the system comprising:

a torque converter including an impeller, a turbine, and an impeller clutch for alternately engaging and disengaging a drive connection between the impeller and the power source;

a first sensor producing a first signal representing a speed of the turbine;

second sensors that produce second signals, each second signal representing a magnitude of an operating parameter of the power source; and a controller electrically communicating with the first sensor and the second sensors, the controller being configured to determine a current magnitude of torque produced by the power source, a desired slip across the impeller clutch, and a actual slip across the impeller clutch, and to change the operating state of the impeller clutch such that the actual impeller clutch slip is equal to the desired impeller clutch slip.

6. The system of claim 5, further comprising:

a source of converter charge pressure communicating with the impeller clutch; and a source of converter discharge pressure communicating with the impeller clutch, a magnitude of differential force across the impeller clutch due to converter charge pressure and converter discharge pressure alternately producing multiple operating states of the impeller clutch; and wherein the controller is further configured to vary the magnitude of the differential force.

7. The system of claim 5, further comprising:

a source of converter charge pressure communicating with the impeller clutch; and a source of converter discharge pressure communicating with the impeller clutch, a magnitude of differential force across the impeller clutch due to converter charge pressure and converter discharge pressure alternately producing multiple operating states of the impeller clutch; and an orifice located in a fluid flow path between the source of converter charge pressure and the impeller clutch, and having a variable fluid flow area;

a solenoid for changing the fluid flow area of the orifice; and the controller is further configured to issue command signals to the solenoid that vary the fluid flow area of the orifice and the magnitude of the differential force.

8. The system of claim 5, further comprising:

a cover enclosing the torque converter and driveably connected to the power source and impeller clutch.

9. The system of claim 5, wherein the impeller clutch includes:

a source of converter charge pressure communicating with the impeller clutch;

a source of converter discharge pressure communicating with the impeller clutch, a magnitude of differential force across the impeller clutch due to converter charge pressure and converter discharge pressure alternately producing multiple operating states of the impeller clutch;

a first surface driveably connected to the impeller and communicating with the source of converter discharge pressure; and a second surface driveably connected to the power source and communicating with the source of converter charge pressure, a magnitude of differential pressure between the first surface and second surface alternately producing full engagement, full disengagement and partial engagement of the impeller clutch.

10. The system of claim 5, wherein the impeller clutch includes:

a source of converter charge pressure communicating with the impeller clutch;

a source of converter discharge pressure communicating with the impeller clutch, a magnitude of differential force across the impeller clutch due to converter charge pressure and converter discharge pressure alternately producing multiple operating states of the impeller clutch;

a first surface driveably connected to the impeller and communicating with the source of converter discharge pressure, which produces a first pressure force on the first surface; and a second surface driveably connected to the power source and communicating with the converter charge circuit, a magnitude of differential pressure force between the first surface and second surface alternately producing full engagement, full disengagement and partial engagement of the impeller clutch.

11. A system for controlling a torque converter of an automatic transmission for a vehicle driven by a power source, the system comprising:

a torque converter including an impeller, a turbine, and an impeller clutch for alternately engaging and disengaging a drive connection between the impeller and the power source; and a controller configured to determine a current magnitude of torque produced by the power source, a desired speed ratio of the torque converter, a K-factor of the torque converter, and a desired impeller speed from the K-factor and desired speed ratio, and to change the operating state of the impeller clutch such that the speed of the impeller is equal to the desired impeller speed.

12. The system of claim 11, further comprising:

a source of converter charge pressure communicating with the impeller clutch; and a source of converter discharge pressure communicating with the impeller clutch, a magnitude of differential force across the impeller clutch due to converter charge pressure and converter discharge pressure alternately producing multiple operating states of the impeller clutch; and wherein the controller is further configured to vary the magnitude of the differential force.

13. The system of claim 11, further comprising:

a source of converter charge pressure communicating with the impeller clutch; and a source of converter discharge pressure communicating with the impeller clutch, a magnitude of differential force across the impeller clutch due to converter charge pressure and converter discharge pressure alternately producing multiple operating states of the impeller clutch;

an orifice located in a fluid flow path between the source of converter charge pressure and the impeller clutch, and having a variable fluid flow area;

a solenoid for changing the fluid flow area of the orifice; and wherein the controller is further configured to issue command signals to the solenoid that vary the fluid flow area of the orifice and the magnitude of the differential force.

14. The system of claim 11, wherein the impeller clutch includes:

a source of converter charge pressure communicating with the impeller clutch;

a source of converter discharge pressure communicating with the impeller clutch, a magnitude of differential force across the impeller clutch due to converter charge pressure and converter discharge pressure alternately producing multiple operating states of the impeller clutch;

a first surface driveably connected to the impeller and communicating with the source of converter discharge pressure; and a second surface driveably connected to the power source and communicating with the source of converter charge pressure, a magnitude of differential pressure between the first surface and second surface alternately producing full engagement, full disengagement and partial engagement of the impeller clutch.

15. The system of claim 11, wherein the impeller clutch includes:

a source of converter charge pressure communicating with the impeller clutch;

a source of converter discharge pressure communicating with the impeller clutch, a magnitude of differential force across the impeller clutch due to converter charge, pressure and converter discharge pressure alternately producing multiple operating states of the impeller clutch;

a first surface driveably connected to the impeller and communicating with the source of converter discharge pressure, which produces a first pressure force on the first surface; and a second surface driveably connected to the power source and communicating with the converter charge circuit, a magnitude of differential pressure force between the first surface and second surface alternately producing full engagement, full disengagement and partial engagement of the impeller clutch.

* * * * *